United States Patent
Tsuchiya et al.

(10) Patent No.: US 7,360,086 B1
(45) Date of Patent: Apr. 15, 2008

(54) COMMUNICATIONS CONTROL METHOD AND INFORMATION RELAYING DEVICE FOR COMMUNICATIONS NETWORK SYSTEM

(75) Inventors: Kazuaki Tsuchiya, Ebina (JP); Shinji Nozaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/455,363

(22) Filed: Dec. 6, 1999

(30) Foreign Application Priority Data

Dec. 7, 1998 (JP) ............................... 10-347235

(51) Int. Cl.
*H04L 9/00* (2006.01)
*H04L 12/28* (2006.01)
*H04L 12/56* (2006.01)

(52) U.S. Cl. .................... 713/168; 370/389; 726/22

(58) Field of Classification Search ............... 713/201, 713/152, 170, 168; 709/225, 209; 370/389; 726/22

See application file for complete search history.

(56) References Cited

U.S. PATENT DOCUMENTS

| | | | | |
|---|---|---|---|---|
| 5,485,455 A | * | 1/1996 | Dobbins et al. ............ | 370/255 |
| 5,661,719 A | * | 8/1997 | Townsend et al. .......... | 370/216 |
| 5,752,003 A | * | 5/1998 | Hart ........................... | 709/223 |
| 5,898,780 A | * | 4/1999 | Liu et al. .................... | 713/155 |
| 6,049,834 A | * | 4/2000 | Khabardar et al. ......... | 709/242 |
| 6,075,776 A | * | 6/2000 | Tanimoto et al. ........... | 370/254 |
| 6,161,185 A | * | 12/2000 | Guthrie et al. .............. | 713/201 |
| 6,311,218 B1 | * | 10/2001 | Jain et al. ................... | 709/229 |
| 6,421,779 B1 | * | 7/2002 | Kuroda et al. .............. | 713/169 |
| 6,640,301 B1 | * | 10/2003 | Ng .............................. | 713/156 |
| 6,891,819 B1 | * | 5/2005 | Inoue et al. ................. | 370/338 |

OTHER PUBLICATIONS

"Network Components", Dec. 2, 1998, pp. 1-13.*
Malkin et al, "Portable Node Support Using Mobile IP Protocol", Jul. 1997, pp. 1-11.*

* cited by examiner

*Primary Examiner*—Emmanuel L. Moise
*Assistant Examiner*—Michael Pyzocha
(74) *Attorney, Agent, or Firm*—Mattingly, Stanger, Malur & Brundidge, P.C.

(57) ABSTRACT

A LAN switch is one component of a communications network system composed of a virtual LAN having network terminals such as personal computers connected with ports respectively. The LAN switch provides a host table for holding correspondence between each port and address information of the network terminal connected to each port and an authentication table for holding information for authenticating a user of each network terminal. If a request takes place of changing the correspondence about the source network terminal held in the host table when relaying the packets, the LAN switch prompts a user name and a password for the source network terminal, does user authentication on the basis of the information held in an authentication table, and enables rewrite of the host table and relay of the packets if the user is correct. These processes are executed for easily preventing false use of an address or tapping or false access by a malignant user as well as analyzing or recovering the erroneously set address.

12 Claims, 6 Drawing Sheets

FIG.2

HOST TABLE (14)

| SOURCE IP ADDRESS (14a) | SOURCE MAC ADDRESS (14b) | DESTINATION MAC ADDRESS (14c) | PORT NUMBER (14d) | VLAN (14e) |
|---|---|---|---|---|
| 10.0.0.31 | 10:00:00:00:00:31 | 10:00:00:00:00:51 | 21 | 1 |
| 10.0.0.32 | 10:00:00:00:00:32 | 10:00:00:00:00:52 | 22 | 1 |
| 10.0.0.33 | 10:00:00:00:00:33 | 10:00:00:00:00:53 | 23 | 2 |
| 10.0.0.34 | 10:00:00:00:00:34 | 10:00:00:00:00:54 | 24 | 2 |
|  |  |  |  |  |

FIG.3

AUTHENTICATION TABLE (16)

| IP ADDRESS (16a) | USER NAME (16b) | PSSWORD (16c) | CONTACT MAIL ADDRESS (16d) |
|---|---|---|---|
| 10.0.0.31 | PC31 | PSS31 | pc31@hitachi.co.jp, sw11a@hitachi.co.jp |
| 10.0.0.32 | PC32 | PSS32 | pc32@hitachi.co.jp, sw11a@hitachi.co.jp |
| 10.0.0.33 | PC33 | PSS33 | pc33@hitachi.co.jp, sw11a@hitachi.co.jp |
| 10.0.0.34 | PC34 | PSS34 | pc34@hitachi.co.jp, sw11a@hitachi.co.jp |
|  |  |  |  | ns and Information Relaying Device
COMMUNICATIONS CONTROL METHOD AND INFORMATION RELAYING DEVICE FOR COMMUNICATIONS NETWORK SYSTEM

BACKGROUND OF THE INVENTION

The present invention relates to a communications control technology and an information relaying technology intended for a communications network system such as a LAN (Local Area Network). More particularly, the present invention relates to the technology which may be effectively applied to a communication control method intended for an inter-network device such as a LAN switch (Layer 2 switch, Layer 3 switch, or the like) and a communications network system composed of the inter-network devices.

One of the technologies characterized by the LAN switch is a VLAN (Virtual LAN). The VLAN is a technology which makes it possible to build the LAN without depending upon a physical port of the inter-network device. The VLAN may be divided into the following types; a port-based VLAN, a MAC (Media Access Control) address-based VLAN, a Layer 3 protocol-based VLAN, an IP (Internet Protocol) subnet-based VLAN, and the like.

For example, in the communications network system of the IP subnet based VLAN, a LAN switch 210 provided with plural ports 221 to 225 receives packets destined for a PC (Personal Computer) 233 from a PC 231. In response, the LAN switch 210 operates to learn a source MAC address and a source IP address and then create a host table 220. Then, the LAN switch 210 operates to refer to the host table with the destination IP address of the received packet as a key and then, if the host table 220 includes an entry having the corresponding destination IP address to the source IP address, output the packet to the port specified by a port number field of the entry. If such an entry is not found in the host table 220, the LAN switch 210 operates to refer to a routing table (not shown) and an ARP (Address Resolution Protocol) table (not shown) for determining a next hop. Then, the LAN switch 210 operates to create a new entry of the host table 220 and then output the packet to the corresponding port to the next hop. The foregoing procedure is the relaying operation of the LAN switch 210 from the PC 231 to the PC 233.

Further, the LAN switch 210 operates to periodically delete an entry of the host table 220 and newly learn the addresses based on the source and the destination information of the received packet for keeping the entry of the host table 220 being updated. Hence, if the PC is moving to another place, the LAN switch 210 may correctly relay the packets to the moved port. That is, if the PC is moved, the PC may automatically restart the communication in a similar manner to that before movement.

SUMMARY OF THE INVENTION

However, the foregoing prior art has the following technical problems.

First, the prior art has no guard against the erroneous setting of an IP address or the like. For example, it is assumed that a user of the PC 232 erroneously sets an IP address of the PC 231 to the PC 232 and connects the PC 232 to the port 222. In this assumption, the LAN switch 210 determines that the PC 231 is moved from the port 221 to the port 222 and rewrites the host table 220 based on the determination. As a result, some communication failure may take place. For example, the PC 231 with the correct IP address set thereto disables to do any communication. If lots of PCs are connected to the network, it is necessary to do a wasteful and troublesome work to analyze the cause of the communication failure and recover the communication from the failure.

Second, the prior art allows a malignant user to tap the data or pass himself or herself off as another person. For example, it is assumed that a user of the PC 235 erroneously sets the IP address of the PC 231 to the PC 235 and connects the PC 235 to the port 255. In this assumption, the LAN switch 210 determines that the PC 231 is moved from the port 221 to the port 225 and rewrites the host table 220 based on the determination. As a result, the user of the PC 235 receives the data destined for the PC 231 and taps it or passes himself or herself off as the user of the PC 231.

It is an object of the present invention to provide a management technology and an information relaying technology of a communications network system which make it possible to prevent the communication failure caused by erroneously setting a logical or physical network address and to speed up the analysis of the cause of the communication failure and the recovery from the communication failure.

It is another object of the present invention to provide a management technology and an information relaying technology of a communications network system which make it possible to improve security of the communications network system by preventing tapping data or feigning another person by a malignant user.

According to the invention, a management method of a communications network that is configured by connecting user terminals or other relaying devices to plural I/O ports provided in the information relaying device such as the LAN switch and enables to dynamically change the connecting state of the I/O ports with each user by learning the change of the connecting state of each user terminal with an I/O port and updating a control table for managing correspondence between the I/O ports and the network address, comprises the steps of executing a user authentication to a user terminal having transmitted the communication information when a request causes updating a control table about the connecting state in response to sending and receiving information between the user terminals, that is, between I/O ports and updating the control table and sending and receiving information based on the updated table only if the user is authenticated as a true person.

Further, the management method comprises the steps of registering contact mail addresses of each user terminal and a system administrator in an authentication table having stored network addresses, user names, passwords and the like used for the user authentication and sending a message having described occurrence of the update request to a user terminal having transmitted information, a system administrator and the like by e-mail. In this sending operation, whether or not the user authentication is successful, the user name obtained by the user authentication is stored in the message.

Concretely, the present invention has the following features.

As a first respect, the present invention provides a management method of the LAN switch network system which enables to prevent communication failure caused by erroneously setting an IP address or the like and tapping data or feigning another person by a malignant user in a communications network system composed of LAN switches and is characterized by the following points in the communications network system such as an IP subnet-based VLAN or the like:

(a) About each PC connected to the LAN switch, the administrator of the LAN switch pre-registers the IP address and its relevant user name, password and contact mail address in the LAN switch according to each user's setting. The administrator of the LAN executes the registration from the administrator's terminal connected to the LAN switch.

(b) Likewise, the administrator of the LAN switch pre-registers his or her own contact mail address to the LAN switch.

(c) The LAN switch creates an authentication table for registering information on each PC and the administrator of the LAN switch.

(d) In receipt of a packet destined for a PC from another PC, the LAN switch creates a host table by learning a source MAC address and a source IP address of a packet. If the entry corresponding to the source IP address is not included in the host table and thus is newly created or the terminal connecting information of the entry is rewritten into different content, at the port for receiving the packet, the LAN switch prompts the user name and the password for the PC having the source IP address of the packet. The LAN switch then waits for the user name and the password being given back thereto and then sends a message that a request of rewriting the host table occurs (the message including the user name given back from the PC as the information) to the contact mail address corresponding to the source IP address included in the authentication table. Unless the user name and the password pre-registered in the authentication table can be obtained (including no response being given back within a given interval of time), the LAN switch operates to stop rewriting of the entry in the host table and discard the relevant packet. If the user name and the password pre-registered in the authentication table can be obtained, the LAN switch operates to refer to the host table with the destination IP address of the packet as a key. If the entry having the corresponding source IP address to the destination IP address is included in the host table, the LAN switch operates to output the packet to the port specified by a port number field of the entry. If no entry can be found, the LAN switch operates to refer to the routing table and the ARP table for determining the next hop, newly create the entry of the corresponding host table, and output the packet to the port connecting to the next hop.

The management method of the LAN switch network system viewed from the first respect makes it possible to automatically restart the similar communication to that before the movement if each PC is moved from one port to another port of the LAN switch. In this movement, the pre-registered user name and password are prompted by the LAN switch. Hence, no user other than the user having known the password can tap the information or pass itself off as another user. Moreover, a user of a PC may erroneously set the IP address of another PC to his or her PC and connects to the port of the LAN switch. In this case, the message reporting the erroneous setting (including the user name of the PC having the erroneously set IP address) is sent to the user of another PC and the administrator of the LAN switch. Hence, the user of another PC and the administrator of the LAN switch can easily classify (analyze) the cause of the failure. This makes it possible to do a swift recovering process.

From a second aspect, the present invention provides the LAN switch which has the following means.

(a) Communicating means for transferring packets between the ports of the LAN switch.

(b) Relaying means for relaying a packet passed from the communicating means and indicating the communicating means to output the packet from one of the ports. The relaying means performs the following operations when relaying information.

The relaying means creates a host table by learning the source MAC address and the source IP address of the packet passed from the communicating means. If no entry corresponding to the source IP address is included in the host table and thus a new entry is created or the terminal connecting information of the corresponding entry is rewritten into different content, the relaying means operates to inquire the permission of rewriting (including new creation) of the below-described authenticating means. If a notice about inhibit of rewriting is received as a result of the inquiry, the relaying means operates not to rewrite the entry of the host table 1 and discard the corresponding packet. If a notice about permission of rewriting is received, the relaying means operates to refer to the host table with the destination IP address of the packet as a key. If the entry having the corresponding source IP address to the destination IP address is included in the host table, the relaying means operates to instruct the communicating means to output the packet to the port. If no such an entry is included in the host table, the relaying means operates to refer to the routing table and the ARP table for determining the next hop, newly create the entry corresponding to the host table, and instruct the communicating means to output the packet to the suitable port.

(c) Authenticating means for authenticating a user based on a user name and a password pre-registered in the authentication table. The authenticating means performs the following operations in authenticating the user.

The authenticating means operates to register an IP address, a user name, a password, a contact mail address, and the like of each PC pre-entered through a management terminal or the like for creating an authentication table. In response to an indication given from the relaying means, the authenticating means operates to create a message for giving a request for an input of a user name and a password to the PC of the indicated IP address and instruct the communicating means to send out the packet to the proper port. At a time, the authenticating means waits for the user name and the password being given back thereto, creates a message for reporting the message that a request of rewriting an entry of the host table takes place (the message including the user name being given back from the PC) to the corresponding contact mail address to the IP address included in the authentication table, and instructs the communicating means to send out the created message. If the user name and the password being given back thereto are not registered in the authentication table (including the case that no response is given back within a given interval of time), the authenticating means operates to notify the relaying means 13 of the inhibit of rewriting the entry of the host table. If the user name and the password being given back thereto are pre-registered in the authentication table, the authenticating means operates to notify the relaying means of the permission of rewriting the entry of the host table.

The LAN switch according to the second respect is arranged to preferably implement the management method of the LAN switch network system arranged from the first respect.

From the third respect, in the LAN switch arranged as described above, the authenticating means operates to create a message of requesting the PC of the IP address of the entry of the host table indicated by the relaying means to send the user name and the password, instruct the communicating means to send out the packet to the proper port. If the user name and the password being sent are not registered in the authentication table (including the case that no response is being given back within a given interval of time), the authenticating means operates to notify the relaying means 13 of the inhibit of rewriting the entry of the host table as well as instruct the relaying means to disable the port having received the packet and discard all the packets received from the port.

The LAN switch arranged according to the third respect enables to reduce the traffic load of repeating a request for entering a user name and a password burdened when the IP address or the like is erroneously set or a malignant user taps the data or passes himself or herself off as another person by using the address of another PC.

From a fourth respect, in the LAN switch arranged as described above, the authenticating means creates a message of requesting the PC of the IP address of the entry of the host table indicated by the relaying means to send the user name and the password, and instructs the communicating means to output the message to the receive port. If the user name and the password being sent thereto are not registered in the authentication table (including the case that no response is given back thereto within a given time of interval), the authenticating means notifies the relaying means of the inhibit of rewriting the entry of the host table, creates a message of warning the user of each PC belonging to the same VLAN as the source IP address of the packet of a possibility of malignant communications done by the malignant user such as tapping data and passing himself or herself off as another person, and instructs the communicating means to send out the warning message.

From another aspect of the fourth aspect, in the LAN switch arranged as described above, the authenticating means operates to create a message of requesting the PC of the IP address of the entry of the host table indicated by the relaying means to send the user name and the password and instruct the communicating means to output the packet to the receive port. Only if the user name and the password being sent are not registered in the authentication table (including the case that no response is being given back within a given interval of time), the authenticating means operates to create a message of reporting that a rewrite of the host table is failed to the contact mail address corresponding to the source IP address included in the authentication table and then instruct the communicating means to send out the message.

The foregoing LAN switch makes it possible to issue to a concerned user or a user to be possibly concerned a warning message that the IP address or the like is erroneously set or a malignant user intends to tap the data or pass himself or herself off as another person by using an address of another PC.

Further, the foregoing LAN switch is arranged to eliminate mails to be sent to a true user at a successful rewriting time (if a true user does communications in a proper range of use) for reducing a traffic amount and to report the result only if the rewrite is failed for more rapidly classifying (analyzing) the cause of the failure and recovering the communication from the failure.

From a fifth respect, in the LAN switch arranged as described above, the authenticating means is served to inquire each entry of the user name and the password periodically, not at the time of newly creating or rewriting the entry of the host table.

The LAN switch arranged from the fifth respect is arranged to check if the IP address is erroneously set or if the malignant user taps the data or pretends to be another user by using the address of another PC with respect to the PC dedicated to receiving the packets.

The LAN switch arranged from the fifth respect operates to check if the port is erroneously connected, the IP address is erroneously set, or a malignant user sets the IP address of a true user to the port to which the true user has being connecting for tapping data or passing himself or herself off as a true user.

From a sixth respect, in the LAN switch arranged as described above, the relaying means operates to inquire the authenticating means of whether or not an entry is to be rewritten at a time of newly creating an entry of the corresponding host table to the source IP address of the received packet or rewriting the entry of the host table. At a time, about the destination IP address of the received packet, likewise, the relaying means operates to inquire the authenticating means of whether or not an entry is to be rewritten at a time of newly creating or rewriting an entry having the corresponding destination IP address of the host table to the source IP address.

The LAN switch arranged according to the sixth respect is arranged to check if the IP address or the like is erroneously set or a malignant user taps data or passes himself or herself off as another user by using an address of another PC with respect to the PCs dedicated to receiving the packets.

The LAN switch arranged according to the sixth respect is arranged to check if the port is erroneously connected, the IP address is erroneously set, or a malignant user sets an IP address of a true user to the PC and connects the PC to the port to which the true user has being connecting for tapping the data or passing himself or herself off as a true user in communication by using the address of another PC.

Further, the LAN switch arranged according to the sixth respect is arranged to check if the port is erroneously connected, the IP address is erroneously set, or a malignant user sets an IP address of a true user and connects the PC to a port to which the true user has being connecting for tapping the data or passing himself or herself off as a true user in communication by using the IP address of the true user.

BRIEF DESCRIPTION OF THE DRAWINGS

FIG. 2 is a conceptual view showing an example of a host table used in the LAN switch according to the first embodiment of the invention;

FIG. 3 is a conceptual view showing an example of an authentication table used in the LAN switch according to the first embodiment of the invention;

DESCRIPTION OF THE EMBODIMENTS

Hereafter, the embodiments of the invention will be described with reference to the appended drawings.

Figure 1:
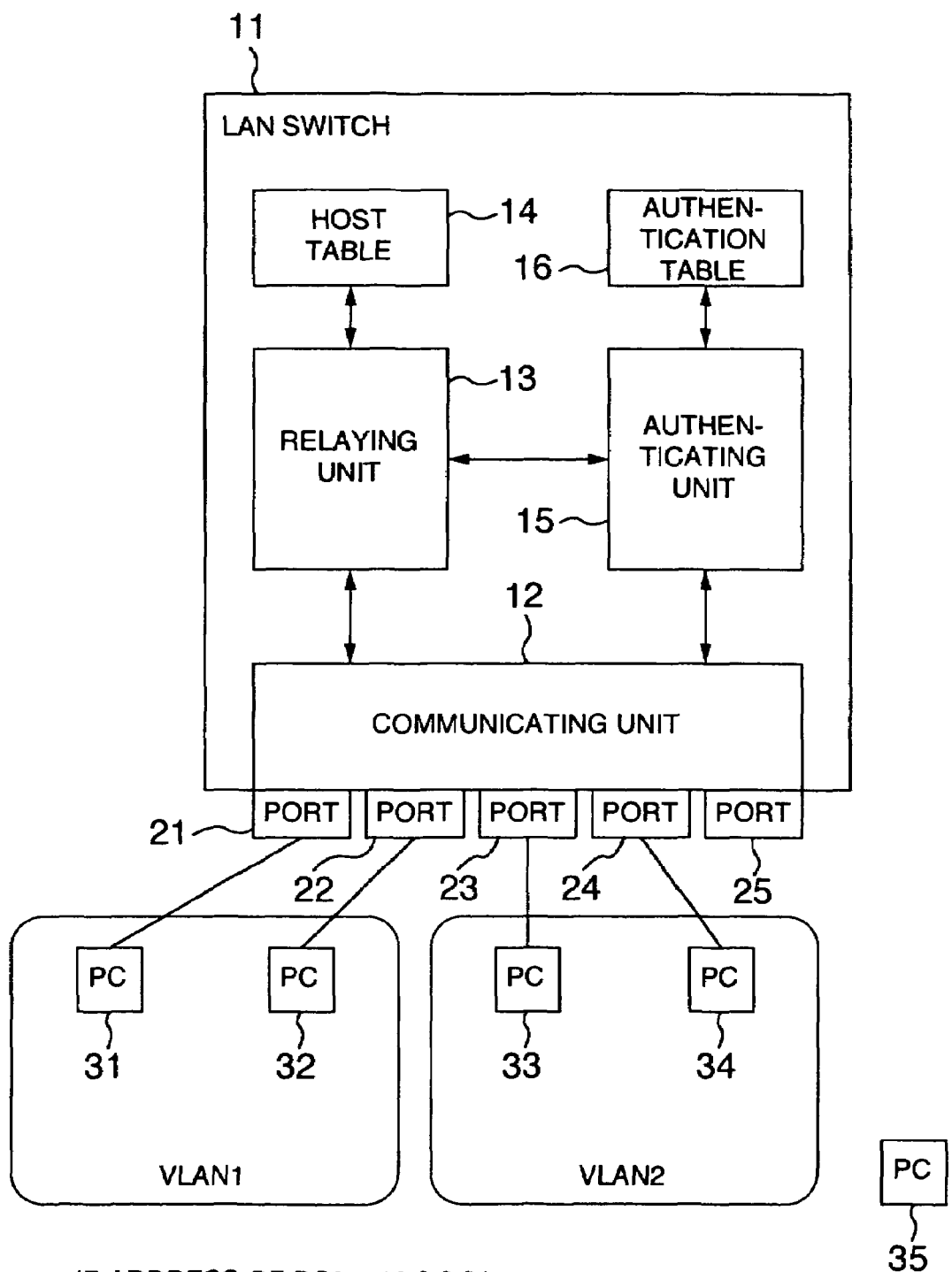
FIG. 1 is a conceptual view showing an arrangement of a LAN switch for implementing a management method of a communications network system according to a first embodiment of the present invention.
Figure 4:
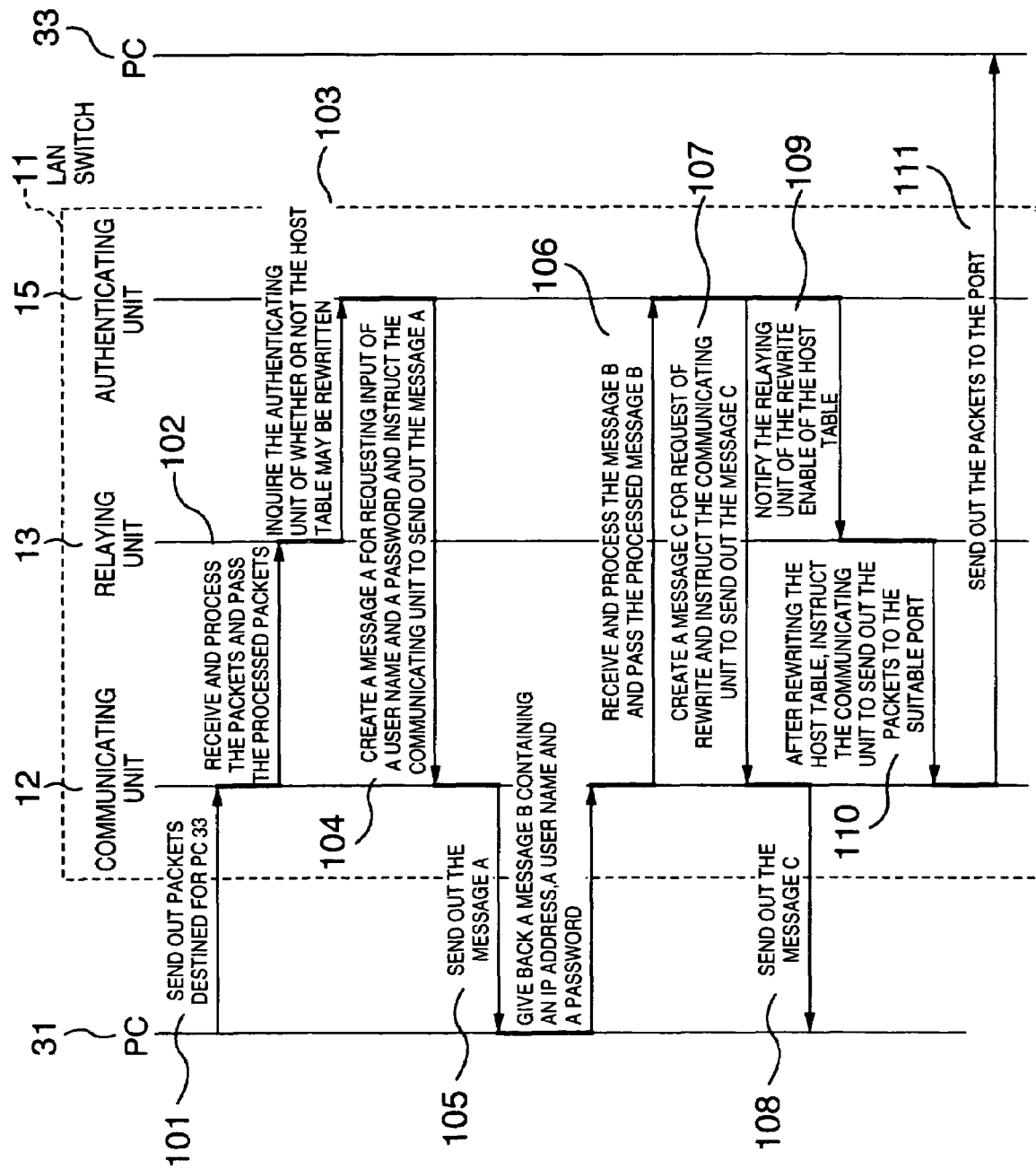
FIGS. 4 to 6 are flowcharts showing an operation of the LAN switch according to the first embodiment.
Figure 5:
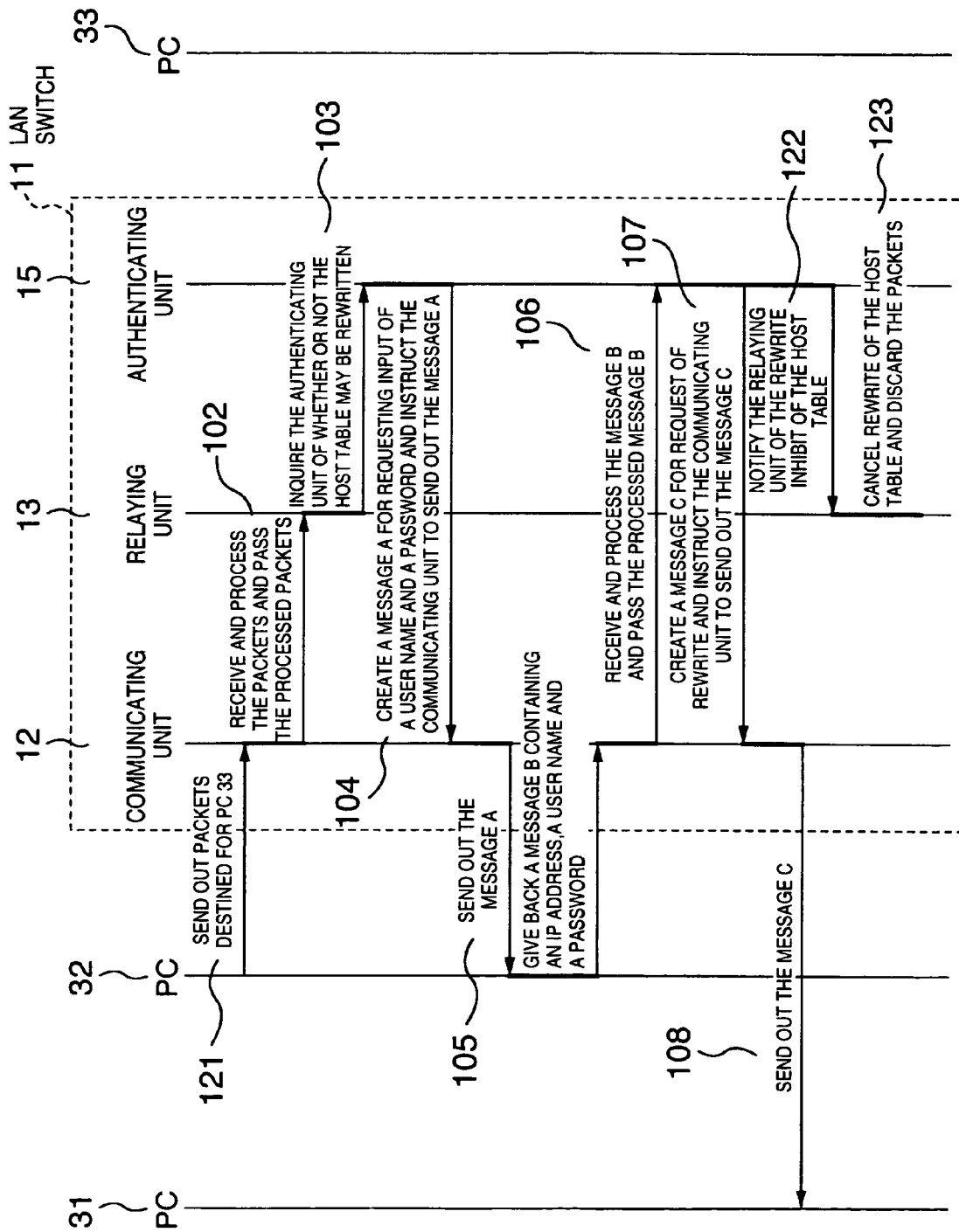
Figure 6:
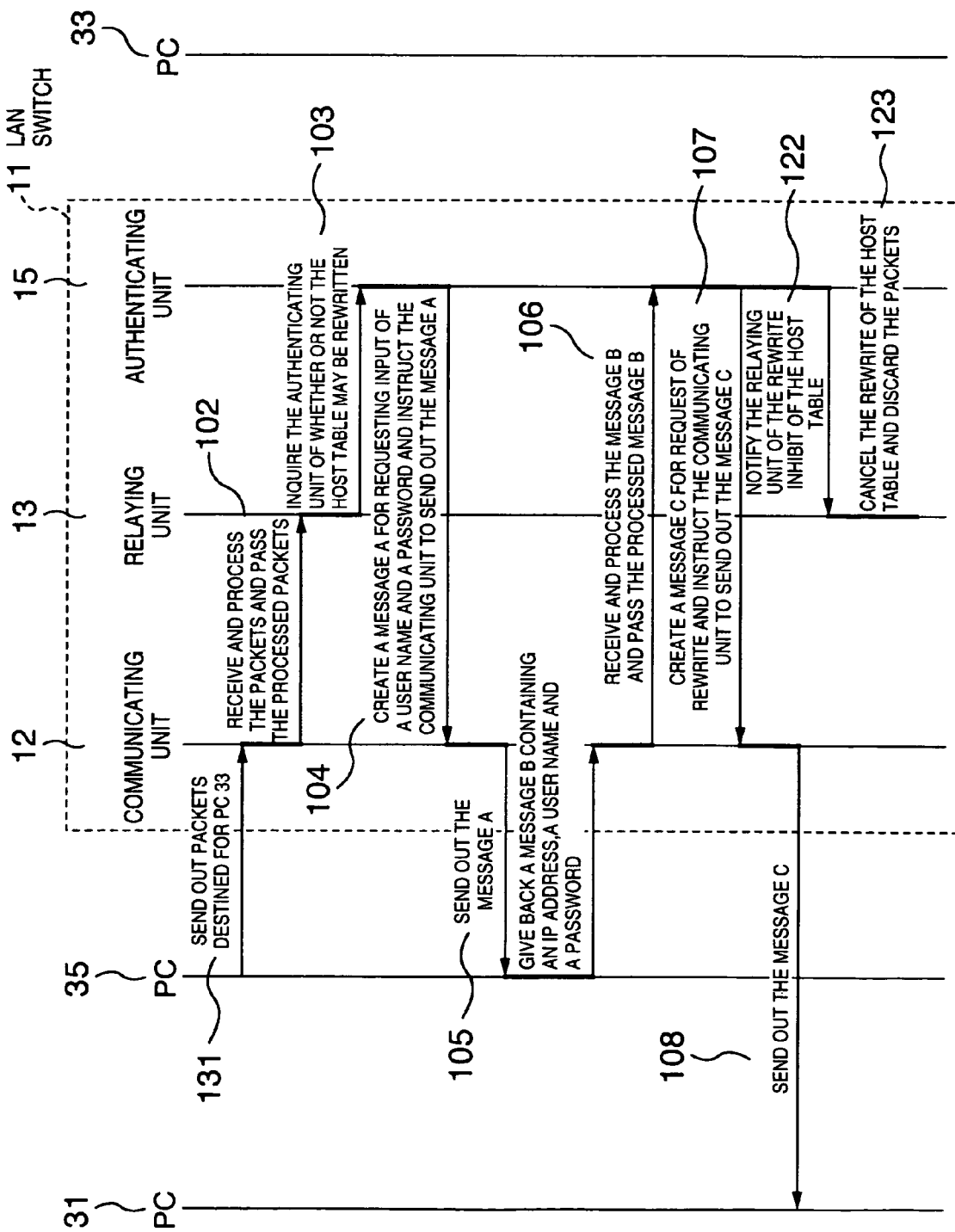
Figure 7:
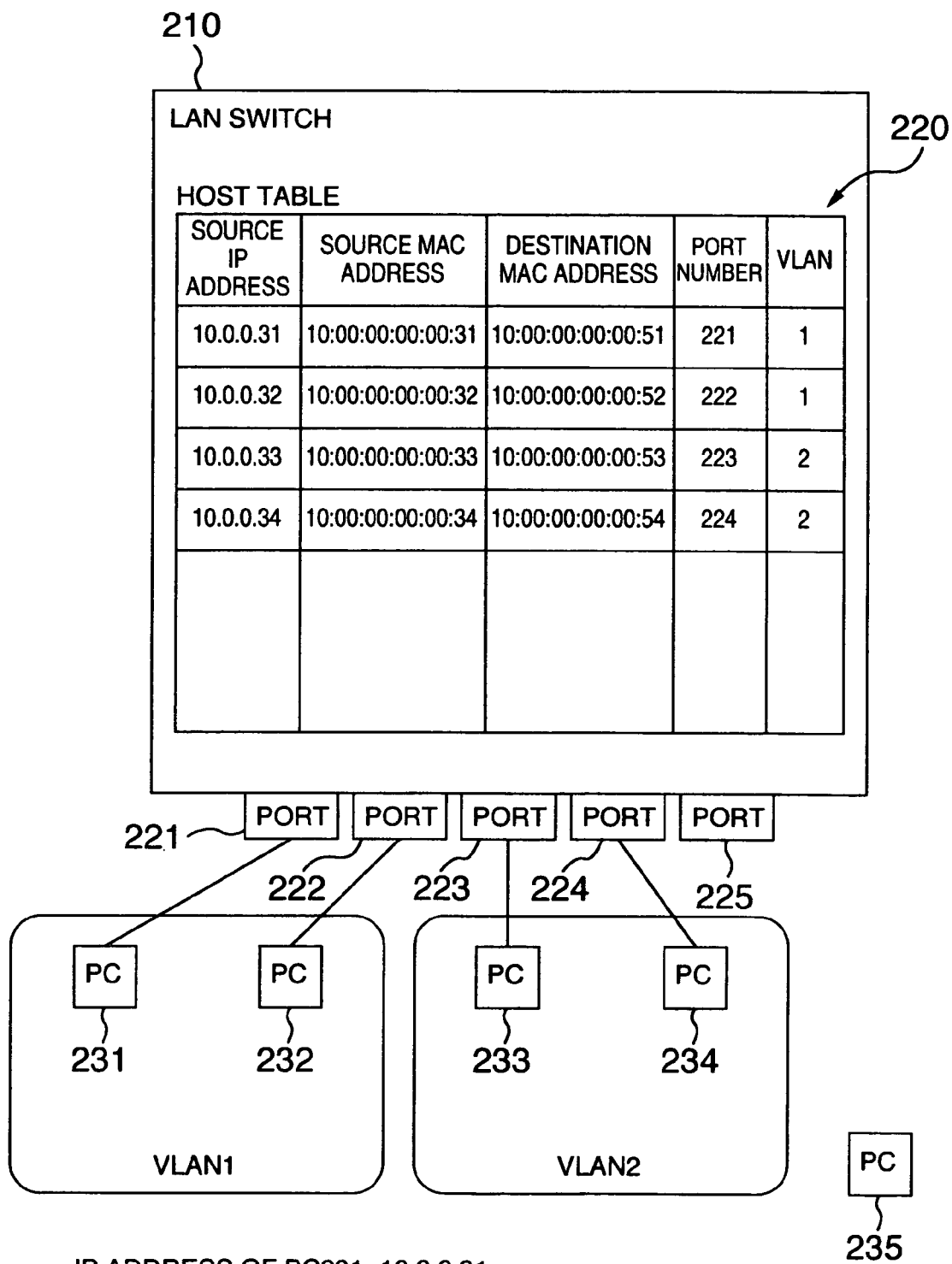
FIG. 7 is a conceptual view showing an IP subnet based VLAN according to the prior art of the present invention.

FIG. 1 is a conceptual view showing an arrangement of a LAN switch for implementing a management method of a communications network system according to a first embodiment of the invention and an IP subnet based VLAN to which the LAN switch is applied. FIGS. 2 and 3 are conceptual views showing various kinds of control informations used in the LAN switch according to this embodiment. FIGS. 4 to 6 are flowcharts showing the management method of the communications network system and the function of the LAN switch according to this embodiment.

The LAN switch 11 of this embodiment is arranged to relay packets among ports 21 to 25 based on a host table 14 as shown in FIG. 2 created by learning the connection information from the received packets (communication information), for realizing the communication among the PCs 31 to 34. The LAN switch 11 is composed of a communicating unit (communicating means) 12, a relaying unit (relaying means) 13, and an authenticating unit (authenticating means) 15.

The communicating unit 12 is served to transfer packets among the ports 21 to 25. This unit 12 is composed of electronic devices such as a CPU, an ASIC, a RAM, and a ROM.

As illustrated in FIG. 2, the host table 14 stores a source IP address 14a, a source MAC address 14b, an destination MAC address 14c, a port number 14d, and a belonging network 14e in a manner to make those kinds of data correspond with one another. The belonging network 14e indicates a network like a VLAN to which the port indicated by the port number 14d belongs. The host table 14 is provided in a storage device such as a RAM together with an authentication table 16 (to be discussed below). If the destination terminal is not directly connected to the LAN switch, the MAC address of the next hop is set to the destination MAC address 14c. The destination MAC address 14c is optional and may be used for more detailed analysis when the address of the connecting terminal is erroneously set or the address is incorrectly or illegally used. Further, for the similar purpose, the destination IP address may be set to the host table 14.

The authenticating unit 15 is served to determine if the rewrite of the host table 14 is enabled. This unit is composed of electronic devices such as a CPU, an ASIC, a RAM, and a ROM. The information based on which the rewrite is determined to be enabled or disabled is pre-registered in the authentication table 16 (to be discussed below).

FIG. 3 is a view showing the authentication table 16 used in the LAN switch 11 according to this embodiment. The authentication table 16 holds the IP addresses 16a of the PC 31 to 34, the user names 16b of those PCs, the passwords 16c, and the contact mail addresses 16d, registered through a console terminal (not shown) or the like.

At first, the description will be oriented to the operation of the communication from the PC 31 to the PC 33.

FIG. 4 is a flowchart showing an example of an operation of the LAN switch 11 and the management method of the communications network system of this embodiment in the case of communicating the data from the PC 31 to the PC 33.

The administrator of the LAN switch 11 pre-registers the IP addresses of the PCs 31 to 34, the user names of the PCs 31 to 34, the relevant passwords, and the contact mail addresses through the management terminal or the like. Likewise, the administrator of the LAN switch 11 pre-registers his own contact mail address. In correspondence with these registrations, the LAN switch 11 creates the authentication table 16 in which the information about the PCs 31 to 34 and the administrator of the LAN switch 11 are registered.

The PC 31 operates to create the packets destined for the PC 33 and then send out them to the port 21 (step 101). The communicating unit 12 of the LAN switch 11 operates to receive the packets from the port 21 and then pass them to the relaying unit 13 (step 102). The relaying unit 13 operates to learn the source MAC address, the destination MAC address which is optional, and the source IP address of the received packet and to create the host table 14 based on the learned data. At this time, if no corresponding entry to the source IP address is found in the host table 14 so that a new entry may be created or if the connecting information (corresponding information of a port, a source IP address and a source MAC address) of the terminal is rewritten in correspondence with the entry, an inquiry as to if the entry may be rewritten (or a new entry may be created) is issued to the authenticating unit 15 (step 103). If no rewrite (new creation) is required, the operation goes to a step 110. The present case holds true to the first packet of the communication data, so the operation goes to the next step for creating a new entry. As to the case of the second packet or later, the operation goes to the step 110.

The authenticating unit 15 operates to create a prompt message for a user name and a password (referred to as a message A), instruct the communicating unit 12 to send out the message, and wait for a given interval of time (step 104). The communicating unit 12 operates to send out the message A to the IP address of the proper port (in this case, the port 21) to the packet (step 105). The communicating unit 12 operates to receive the response message of the message A, that is, the input message of the user name and the password (referred to as a message B) from the PC 31, process the response message, and then pass the processed message to the authenticating unit 15 (step 106).

The authenticating unit 15 operates to compare the IP address, the user name, and the password stored in the message B with the IP address 16a, the user name 16b, and the password 16c written in the authentication table 16, make sure of the coincidence, create a message for reporting a request of rewriting the host table 14 to the contact mail address 16d registered in the entry of the authentication table 16 (which message is referred to as a message C, the message C containing the user name stored in the message B), and instruct the communicating unit 12 to send out the message C (step 107) as well as notify the relaying unit 13 of the rewrite enable (step 109). The communicating unit 12 operates to send out the message C to the mail address (step 108).

When the relaying unit 13 receives a notice about a rewrite enable from the authenticating unit 15, the relaying unit 13 operates to rewrite the concerned entry of the host table 14, refer to the host table 14 with the destination IP address as a key, if an entry having the source IP address which coincides with the destination IP address is found, instruct the communicating unit 12 to output the packet to the concerned port, if no such an entry is found, refer to a routing table (not shown) and an ARP table (not shown) for determining the next hop, newly create the corresponding entry in the host table 14, and instruct the communicating unit 12 to output the packet to the port (step 110). The communicating unit 12 is served to send out the packet to the port (step 111).

The foregoing process is executed for starting the communication from the PC 31 to the PC 33.

Next, the description will be oriented to the operation of doing communications from the PC 31 to the PC 33 after the PC 31 is moved from the port 21 to the port 25. The operation is analogous to that shown in FIG. 4 except that the corresponding entry to the IP address of the PC 31 has been already created in the host table 14.

The PC 31 operates to create the packet destined for the PC 33 and then send it out to the port 25 (step 101). The communicating unit 12 of the LAN switch 11 is served to receive and process the packet and then pass it to the relaying unit 13 (step 102).

The relaying unit 13 is served to learn the source MAC address, the destination MAC address, and the source IP address of the received packet and then create the host table 14 based on the learned data. At this time, if no corresponding entry to the source IP address is found in the host table 14 and such an entry is newly created or if the terminal connecting information of the concerned entry is rewritten, an inquiry as to if the entry rewrite (and the new entry creation) is enabled is given to the authenticating unit 15 (step 103). If no rewrite (and new entry creation) is required, the operation goes to the step 110. This case holds true to the first packet of the restarted communication after movement. The operation goes to a next step at which the entry information is to be rewritten. As to the second packet or later, the operation goes to the step 110.

The authenticating unit 15 operates to create a prompt message (referred to as a message A) for a user name and a password, instruct the communicating unit 12 to send it out, and wait for a given interval of time (step 104). The communicating unit 12 is served to send out the message A to the IP address of the receive port to the packet (step 105). When the communicating unit 12 receives the response message of the message A, that is, an input message of the user name and the password (referred to as a message B), the communicating unit 12 operates to receive and process the response message and then pass it to the authenticating unit 15 (step 106). The authenticating unit 15 operates to compare the IP address, the user name, and the password stored in the message B with the IP address 16*a*, the user name 16*b*, and the password 16*c* written in the authentication table 16, make sure of the coincidence, create a message for reporting a content that a request takes place of rewriting the host table 14 to the contact mail address 16*d* registered in the concerned entry of the authentication table 16 (which message is referred to as a message C, the message C containing the user name stored in the message B), and instruct the communicating unit 12 to send out the message (step 109). The communicating unit 12 is served to send out the message C to the mail address (step 108).

On the other hand, when the relaying unit 12 receives the notice about the rewrite enable from the authenticating unit 15, the relaying unit 13 operates to rewrite the concerned entry of the host table 14, refer to the host table 14 with the destination IP address as a key, if an entry having the source IP address coincident with the destination IP address is found, instruct the communicating unit 12 to output the packet to the concerned port, if no concerned entry is found, refer to a routing table (not shown) and an ARP table (not shown) for determining the next hop, newly create an entry of the concerned host table 14, and instruct the communicating unit 12 to output the packet to the concerned port (step 110). The communicating unit 12 is served to send out the packet to the concerned port (in this case, the port 25) (step 111).

The foregoing process makes it possible for the PC 31 to automatically restart the communication with the PC 33 after the PC 31 is moved from the port 21 to the port 25.

In turn, the description will be oriented to the operation of starting the erroneous communication between the PC 32 and the PC 33 when the PC 32 erroneously sets the IP address of the PC 31 and then connects to the port 22.

FIG. 5 is a flowchart showing an operation of the LAN switch and the management method of the communications network system of this embodiment when the PC 32 erroneously sets the IP address of the PC 31 and connects to the port 22 and then starts the communication with the PC 33.

The PC 32 operates to create the packets destined for the PC 33 and then send them out to the port 22 (step 121). The communicating unit 12 of the LAN switch 11 operates to receive and process the packets and then pass them to the relaying unit 13 (step 102). The relaying unit 13 operates to learn the source MAC address, the destination MAC address, and the source IP address of the received packet and create the host table based on the learned data. At this time, if no corresponding entry to the source IP address is found in the host table 14 and thus the corresponding entry is newly created or if the terminal connecting information of the corresponding entry is rewritten, an inquiry as to if the entry rewrite (and new creation) is enabled is given to the authenticating unit 15 (step 103). If no rewrite (and new creation) is required, the operation goes to the step 110. This case holds true to the first packet of the communication data provided when the PC 32 erroneously sets the IP address of the PC 31 and connects to the port 22 and starts the communication with the PC 33. The operation goes to a next step at which the entry information is to be rewritten. In this case, the rewrite of the entry information is failed. Hence, as to the second packet or later, the operation goes to the next step.

The authenticating unit 15 operates to create a prompt message for a user name and a password (referred to as a message A), instruct the communicating unit 12 to send it out, and wait for a given length of time (step 104). The communicating unit 12 is served to send out the message A to the IP address of receive port (in this case, the port 22) of the concerned packet (step 105). When the communicating unit 12 receives the response message to the message A, that is, the input message of the user name and the password (referred to as a message B), the communicating unit 12 processes the received data and then passes it to the authenticating unit 15 (step 106). The authenticating unit 15 operates to compare the IP address, the user name, and the password stored in the message B with the IP address 16*a*, the user name 16*b*, and the password 16*c* written in the authentication table 16, makes sure of no coincidence, create a message for reporting that a request takes place of rewriting the host table 14 to the contact mail address 16*d* registered in the concerned entry of the authentication table 16 (which message is referred to as a message C, the message C containing the user name stored in the message B), and instruct the communicating unit 12 to send out the message (step 108) as well as notify the relaying unit 12 of the rewrite inhibit (step 122). The communicating unit 12 is served to send out the message C to the mail address. (In this case, the message C is sent to the PC 31 having a true owner of the IP address erroneously set by the PC 32.) (step 108). On the other hand, when the relaying unit 13 receives the notice about the rewrite inhibit from the authenticating unit 15, the relaying unit 13 operates to cancel the rewrite of the concerned entry of the host table 14 and then discard the packet (step 123).

In the foregoing process, when the PC 32 erroneously sets the IP address of the PC 31 and thus connects to the port 22, the message for reporting the erroneous connection (including the user name of the PC 32 having erroneously set the IP address) is sent to the true user of the PC 31 and the administrator of the LAN switch 11. Hence, the user of the PC 31 and the administrator of the LAN switch 11 can easily analyze the cause of the failure, so that the rapid recovery is made possible.

In turn, the description will be oriented to the operation executed when the PC 35 owned by a malignant user sets an IP address of the PC 31 and connects to the port 25 and starts the communication with the PC 33.

FIG. 6 is a flowchart showing an operation of the LAN switch 11 and the management method of the communications network system according to this embodiment provided when the PC 35 owned by the malignant user sets the IP address of the PC 31 and connects to the port 25 and starts the communication with the PC 33.

The PC 35 is served to create the packets destined for the PC 33 and send them out to the port 25 (step 131). The communicating unit 12 of the LAN switch 11 is served to receive and process the packets and then pass the processed packets to the relaying unit 13 (step 102).

The relaying unit 13 is served to learn the source MAC address, the destination MAC address, and the source IP address of the received packet and create the host table 14 based on the learned data. If no corresponding entry to the source IP address is found in the host table 14 and thus such a corresponding entry is newly created or the terminal connecting information of the concerned entry is rewritten, an inquiry as to if the entry rewrite (including the new creation) is enabled is given to the authenticating unit 15 (step 103). If no rewrite (including new creation) is required, the operation goes to a step 110. This case holds true to the first packet of the communication data provided when the PC 35 of the malignant user sets the IP address of the PC 31 and connects to the port 25 and starts the communication with the PC 33. The operation goes to a next step of rewriting the information of the entry. In this case, as a result, if the rewrite of the entry information is failed, as to the second packet or later, the operation goes to the next step as well.

The authenticating unit 15 is served to create a prompt message for a user name and a password (referred to as a message A), instructs the communicating unit 12 to send out the message A, and wait for a given length of time (step 104). The communicating unit 12 is served to send out the message A to the IP address of the proper port to that packet (in this case, the port 25) (step 105). When the communicating unit 12 receives the response message to the message A, that is, the input message of the user name and the password (referred to as a message B), the communicating unit 12 is served to receive and process the message B and then pass it to the authenticating unit 15 (step 106).

The authenticating unit 15 operates to compare the IP address, the user name, and the password stored in the message B with the IP address 16a, the user name 16b, and the password 16c written in the authentication table 16, make sure of no coincidence, create a message for reporting a content that a request takes place of rewriting the host table 14 to the contact mail address 16d registered in the concerned entry of the authentication table 16 (which message is referred to as a message C, the message C including the user name stored in the message B or, if the message B has no user name or does not reach within a given interval of time, the information for reporting it), and send out the message B to the communicating unit 12 (step 122) as well as notify the relaying unit 13 of the rewrite inhibit (step 109).

The communicating unit 12 is served to send out the message C to the mail address (in which case the message C reaches not the packet sender PC 35 but the true user PC 31) (step 108).

When the relaying unit 13 receives the notice about the rewrite inhibit from the authenticating unit 15, the relaying unit 13 operates to cancel the rewrite of the corresponding entry of the host table 14 and discard the packet (step 123).

In the foregoing process, if the PC 35 of the malignant user sets the IP address of the PC 31 and connects to the port 25, the PC 35 is prompted for the user name and the password registered in the LAN switch 11 by the PC 31. In actual, the PC 35 disables to enter the correct data, so that the rewrite of the host table 14 is disabled. This operation, therefore, makes it possible to prevent the tapping by the false access of the PC 35. Further, the administrator of the system having received the message C can grasp what is going on the basis of the information stored in the message C and can take measures against the malignance.

In turn, the description will be oriented to another embodiment.

In the LAN switch 11 according to the first embodiment, the authenticating unit 15 is served to create the message A for prompting the user name and the password for the PC of the IP address of the entry included in the host table 14 indicated by the relaying unit 13, instruct the communicating unit 12 to send out the message A to the proper receive port to the packet, if no user name and password pre-registered in the authentication table 16 are found (including the case that a response is not given back within a given length of time), and notify the relaying unit of the rewrite inhibit of the entry of the host table 14. In the present embodiment, on the other hand, in addition to the foregoing process, the authenticating unit 15 is served to instruct the relaying unit 13 to disable (close) the port where the packet is received and discard all the packets received at the port. This additional process makes it possible to reduce the traffic load burdened by the repetition of the prompt of entering the user name and the password to be executed when the IP address is erroneously set or a malignant user taps the PC of another user or passes himself or herself off as another PC by using the address of another PC.

According to the first embodiment, in the LAN switch 11, the authenticating unit 15 is served to create the message A for prompting the entry of the user name and the password for the PC of the IP address of the entry included in the host table 14 indicated by the relaying unit 13, instruct the communicating unit 12 to send out the message A to the proper receive port to the packet, if no user name and password pre-registered in the authentication table 16 are found (including the case that the response is not given back within a given length of time), and notify the relaying unit 13 of the inhibit of rewriting the entry of the host table 14. In the present embodiment, on the other hand, in addition to the process, the authenticating unit 15 is served to create a message of warning the users of all the PCs belonging to the VLAN having the same source IP address of the packet of the possibilities that the IP address is erroneously set and a malignant user taps the data or does false communications by using the address of another PC and to instruct the communicating unit 12 to send out the warning message. The foregoing process makes it possible to warn the concerned person and the other possible concerned persons of the erroneous setting of the IP address and the tapping or false communication by the malignant user with the address of another PC.

In the LAN switch 11 according to the first embodiment, the authenticating unit 15 is served to newly create or rewrite an entry of the host table 14 and prompt the user name and the password for the PC of the IP address of the entry when an inquiry as to if the rewrite (including the new creation) is enabled is received from the relaying unit 13. In actual, however, the authenticating unit 15 is served to periodically prompt the user name and the password for the PC of the IP address of each entry and check if the user is true. The foregoing process makes it possible to check if the IP address or the like may be erroneously set or a malignant user may tap the data or do false communications by using the address of another PC with regard to the PCs dedicated to receiving the packets.

In the LAN switch 11 according to the first embodiment, the relaying unit 13 is served to inquire the authenticating unit 15 of rewriting the entry if the corresponding entry of the host table 14 to the source IP address of the received packet may be newly created or rewritten. As to the destination IP address of the received packet, similarly, if the entry having the corresponding source IP address to the destination IP address of the host table 14 is newly created or rewritten, the relaying unit is served to inquire the authenticating unit 15 of the rewrite of the entry. If the rewrite is enabled, the entry may be rewritten. The foregoing process makes it possible to check if the IP address or the like may be erroneously set or a malignant user may tap the data or do false communications by using the address of another PC with respect to the PCs set not to transmit the packet but to receive the packets.

In the first embodiment, the description will be oriented to the IP subnet-based VLAN. In place, it may hold true to another type VLAN such as a port based VLAN, a MAC address based VLAN, or a Layer 3 protocol based VLAN.

As described above, the management method of the communications network and the LAN switch according to each embodiment of the invention make it possible to prevent tapping and false communications by a malignant user, thereby improving the security against the communications network system.

Further, by notifying the true user or the administrator of the system of the information such as a user name obtained by the user authentication, it is possible to easily analyze the cause of failure by erroneous setting of the IP address or the like, thereby making the recovery faster.

Moreover, the foregoing embodiment has concerned with the communications network system provided with the VLAN to which the present invention applies. In place, the present invention may apply to the communications network provided with the mobile IP. That is, in the communications network provided with the mobile IP, when the mobile terminal is moved between the subnetworks, the similar problem to the communications network system provided with the VLAN takes place. Hence, when changing the connecting information of the mobile terminal, like the foregoing embodiment, by authenticating the user, the communications network system provided with the mobile IP enables to prevent erroneous setting or incorrect use of the IP address. In this case, in place of the LAN switch, any network relaying device (for example, router) will do if it may support the mobile IP.

What is claimed is:

1. A network relaying method for a communication network system in which a plurality of network devices are coupled via a communication path, each network device including a network relaying device which is coupled via a plurality of I/O ports to a corresponding plurality of terminals, the method comprising the steps of:

receiving a packet at a first I/O port from a source terminal coupled to the first I/O port, the packet including a header containing a packet transmission source address;

determining whether a first combination of information contained in the received packet coincides with a second combination of information that has been registered in advance, wherein said first combination of information includes the first I/O port and the packet transmission source address of the received packet and said second combination of information includes an I/O port and a transmission source address that have been registered in advance with a correspondence therebetween, and, in response to the determining step resulting in a determination that the first combination of information coincides with the second combination of information, transferring the packet received at the first I/O port via a second I/O port, wherein it is determined that said first combination of information coincides with said second combination of information that has been registered in advance when only said first I/O port and said packet transmission source address coincide with said I/O port and transmission source address that have been registered in advance with a correspondence therebetween;

in response to the determining step resulting in a determination that the first combination of information does not coincide with the second combination of information:

limiting transfer of the received packet and transmitting a request for user authentication of a user to the source terminal of said received packet;

receiving user authentication information sent from the source terminal in response to the request for user authentication;

executing user authentication of the user based on the user authentication information thus received and based on the packet transmission source address;

when the user is authenticated by the user authentication executed in the executing step, registering the first I/O port with a correspondence to the packet transmission source address;

transferring the packet received at the first I/O port via the second I/O port; and when the user is not authenticated by the user authentication executed in the executing step, not transferring the packet received at the first I/O port.

2. A network relaying method according to claim 1, wherein the user authentication information includes a user name and a password.

3. A network relaying method according to claim 1, wherein the transmission source address includes an IP address and a MAC address.

4. The network relaying method according to claim 1, further comprising the step of performing user authentication periodically for each of said plurality of terminals having an address registered in advance with a correspondence to an I/O port.

5. The network relaying method according to claim 1, wherein the received packet includes a destination address, and the method further comprises the steps of:

determining whether the destination address is registered in advance as a source address in combination with an I/O port;

if the determining step determines that the destination address of the received packet is not registered in advance as a source address in combination with an I/O port, user authentication is made as to a destination terminal having the destination address, by transmitting a request for user authentication to the destination terminal of the received packet; receiving user authentication information sent from the destination terminal in response to the request for user authentication based on the user authentication information thus received from the destination terminal; when the user is authenticated by the user authentication based on the user authentication information received from the destination terminal, registering the first I/O port with a correspondence to the destination address; and when the user is not authenticated by the user authentication based on the user authentication information received from the destination terminal, not registering the first I/O port with a correspondence to the destination address.

6. A network relaying apparatus, comprising:

a plurality of I/O ports adapted to be coupled to a plurality of terminals, respectively;

a communication portion for transmitting and receiving data via the plurality of I/O ports;

a relay portion which determines a transmitting I/O port of the plurality of I/O ports, from which a packet received via the communication portion from a receiving I/O port of the plurality of I/O ports is output via the communication portion; and which determines whether a first combination of information contained in the received packet coincides with a second combination of information that has been registered in advance, wherein said first combination of information includes the receiving I/O port and a packet transmission source address of the received packet and said second combination of information includes an I/O port and a transmission source address that have been registered in advance with a correspondence therebetween, wherein said relay portion transfers the received packet from the transmitting I/O port in response to the relay portion determining that the first combination of information coincides with the second combination of information, wherein it is determined by said relay portion that said first combination of information coincides with said second combination of information that has been registered in advance when only said receiving I/O port and said packet transmission source address coincide with said I/O port and transmission source address that have been registered in advance with a correspondence therebetween, and wherein said relay portion requests user authentication of a user from a source terminal of said received packet in response to the relay portion determining that the first combination of information does not coincide with the second combination of information;

an authentication portion which registers the receiving I/O port with a correspondence to the packet transmission source address when completing user authentication based on user authentication information sent from the source terminal in response to the request for user authentication and based on the packet transmission source address, wherein when the authentication portion does not authenticate the user, the relay portion does not transfer the received packet.

7. A network relaying apparatus according to claim 6, wherein the user authentication information includes a user name and a password.

8. A network relaying apparatus according to claim 6, wherein the transmission source address includes an IP address and a MAC address.

9. The network relaying apparatus according to claim 6, wherein user authentication is performed periodically for each terminal having an address registered in advance with a correspondence to an I/O port.

10. The network relaying method according to claim 6, wherein the received packet includes a destination address, wherein the relay portion determines whether the destination address is registered in advance as a source address in combination with an I/O port, wherein if the relay portion determines that the destination address of the received packet is not registered in advance as a source address in combination with an I/O port, the relay portion initiates user authentication as to a destination terminal having the destination address by transmitting a request for user authentication to the destination terminal of the received packet and receiving user authentication information sent from the destination terminal in response to the request for user authentication based on the user authentication information thus received from the destination terminal, wherein when the user is authenticated by the user authentication based on the user authentication information received from the destination terminal, the authentication portion registers the receiving I/O port with a correspondence to the destination address, and wherein when the user is not authenticated by the user authentication based on the user authentication information received from the destination terminal, the authentication portion does not register the receiving I/O port with a correspondence to the destination address.

11. A network relaying method for a communication network system in which a plurality of network devices are coupled via a communication path, each network device including a network relaying device which is coupled via a plurality of I/O ports to a corresponding plurality of terminals, the method comprising the steps of:

receiving a packet at a first I/O port from a source terminal coupled to the first I/O port, the packet including a header containing a packet transmission source address;

determining whether a combination of only the first I/O port and the packet transmission source address coincides with a combination of an I/O port and a transmission source address that have been registered in advance with a correspondence therebetween;

when the determining step results in a determination that the combination of only the first I/O port and the packet transmission source address coincides with a combination of an I/O port and transmission source address that have been registered in advance with a correspondence therebetween, transferring the packet received at the first I/O port via a second I/O port;

when the determining step results in a determination that the combination of only the first I/O port and the packet transmission source address do not have a coincidence with a combination of an I/O port and transmission source address that have been registered in advance with a correspondence therebetween:

limiting transfer of the received packet and transmitting a request for user authentication of a user to the source terminal of said received packet;

receiving user authentication information sent from the source terminal in response to the request for user authentication;

executing user authentication of the user based on the user authentication information thus received and based on the packet transmission source address;

when the user is authenticated by the user authentication executed in the executing step, registering the first I/O port with a correspondence to the packet transmission source address;

transferring the packet received at the first I/O port via the second I/O port; and when the user is not authenticated by the user authentication executed in the executing step, not transferring the packet received at the first I/O port;

wherein the source terminal coupled to the first I/O port belongs to a VLAN; and wherein when a user is not authenticated by the user authentication executed in the executing step, a warning message is sent to all terminals belonging to the same VLAN as the source terminal of the packet received at the first I/O port.

12. A network relaying apparatus, comprising:

a plurality of I/O ports adapted to be coupled to a plurality of terminals, respectively;

a communication portion for transmitting and receiving data via the plurality of I/O ports;

a relay portion which determines a transmitting I/O port of the plurality of I/O ports, from which a packet received via the communication portion from a receiving I/O port of the plurality of I/O ports is output via the communication portion; and which determines whether a combination of only the receiving I/O port and a packet transmission source address contained in the packet coincides with a combination of an I/O port and a transmission source address that have been registered in advance with a correspondence therebetween, wherein said relay portion transfers the received packet from the transmitting I/O port when the relay portion determines that the combination of only the receiving I/O port and the packet transmission source address coincides with a combination of an I/O port and transmission source address that have been registered in advance with a correspondence therebetween, and wherein said relay portion requests user authentication of a user from a source terminal of said received packet when the relay portion determines that the combination of only the receiving I/O port and the packet transmission source address do not have a coincidence with a combination of an I/O port and a transmission source address that have been registered in advance with a correspondence therebetween;

an authentication portion which registers the receiving I/O port with a correspondence to the packet transmission source address when completing user authentication based on user authentication information sent from the source terminal in response to the request for user authentication, wherein when the authentication portion does not authenticate the user, the relay portion does not transfer the received packet, wherein the source terminal of the received packet belongs to a VLAN; and wherein when a user is not authenticated by the user authentication, a warning message is sent to all terminals belonging to the same VLAN as the source terminal of the received packet.

* * * * *